(12) United States Patent
Durno et al.

(10) Patent No.: US 12,165,529 B2
(45) Date of Patent: Dec. 10, 2024

(54) SELECTION OF AN ALTERNATE DESTINATION IN RESPONSE TO A CONTINGENCY EVENT

(71) Applicant: Aurora Flight Sciences Corporation, Manassas, VA (US)

(72) Inventors: Carter Durno, Cambridge, MA (US); Jeffery Saunders, Quincy, MA (US); William R. Bosworth, Somerville, MA (US)

(73) Assignee: Aurora Flight Sciences Corporation, Manassas, VA (US)

(*) Notice: Subject to any disclaimer, the term of this patent is extended or adjusted under 35 U.S.C. 154(b) by 112 days.

(21) Appl. No.: 17/148,185

(22) Filed: Jan. 13, 2021

(65) Prior Publication Data

US 2022/0036745 A1     Feb. 3, 2022

Related U.S. Application Data

(60) Provisional application No. 63/059,389, filed on Jul. 31, 2020.

(51) Int. Cl.
*G08G 5/00* (2006.01)
*G01C 21/34* (2006.01)
(Continued)

(52) U.S. Cl.
CPC ....... *G08G 5/0039* (2013.01); *G01C 21/3453* (2013.01); *G06F 18/24147* (2023.01);
(Continued)

(58) Field of Classification Search
CPC ........... G08G 5/0039; G08G 1/096822; G08G 1/096844; G08G 5/0056; G08G 5/006;
(Continued)

(56) References Cited

U.S. PATENT DOCUMENTS 5,398,186 A * 3/1995 Nakhla ................ G08G 5/0021
701/16
9,557,742 B2    1/2017 Paduano
(Continued)

FOREIGN PATENT DOCUMENTS

| EP | 0 743 580 A1 | 11/1996 |
| EP | 3 174 029 A1 | 5/2017 |
| EP | 3 293 718 A2 | 3/2018 |

OTHER PUBLICATIONS

Ogren, P. "Increasing Modularity of UAV Control Systms using Computer Game Behavior Trees", American Institute of Aeornautics and Astronautics, Sep. 2012, pp. 1-8.
(Continued)

*Primary Examiner* — Sohana Tanju Khayer
(74) *Attorney, Agent, or Firm* — Quinn IP Law

(57) ABSTRACT

A method is provided for supporting a robot in response to a contingency event. The method includes detecting the contingency event during travel of the robot on a route to a destination. In response, the method includes determining a position of the robot, and accessing information about alternate destinations associated with the route. The method includes selecting an alternate destination from the alternate destinations based on a time to travel from the position of the robot to the alternate destination, and the information. And the method includes outputting an indication of the alternate destination for use in at least one of guidance, navigation or control of the robot to the alternate destination.

28 Claims, 9 Drawing Sheets

(51) Int. Cl.
  *G06F 18/2413* (2023.01)
  *G08G 1/0968* (2006.01)
  *G08G 5/02* (2006.01)
  *G05D 1/00* (2006.01)

(52) U.S. Cl.
  CPC . *G08G 1/096822* (2013.01); *G08G 1/096844* (2013.01); *G08G 5/0056* (2013.01); *G08G 5/006* (2013.01); *G08G 5/0069* (2013.01); *G08G 5/0086* (2013.01); *G08G 5/025* (2013.01); *G05D 1/106* (2019.05)

(58) Field of Classification Search
  CPC .... G08G 5/0069; G08G 5/0086; G08G 5/025; G01C 21/3453; G06K 9/6276; G05D 1/106
  See application file for complete search history.

(56) References Cited

U.S. PATENT DOCUMENTS

| | | | |
|---|---|---|---|
| 10,453,351 B2 | 10/2019 | Choi et al. | |
| 10,562,643 B1* | 2/2020 | Strabala | G05D 1/101 |
| 11,493,938 B1* | 11/2022 | Harris | G05D 1/106 |
| 2012/0296499 A1* | 11/2012 | Kirchhofer | G05D 1/102 |
| | | | 701/3 |
| 2014/0067267 A1* | 3/2014 | Kolbe | G08G 5/0039 |
| | | | 701/533 |
| 2015/0276774 A1* | 10/2015 | Pollack | B65G 47/90 |
| | | | 198/803.14 |
| 2016/0379366 A1* | 12/2016 | Shah | G06T 7/50 |
| | | | 345/419 |
| 2017/0019479 A1 | 1/2017 | Rangarajan et al. | |
| 2017/0154537 A1* | 6/2017 | Moravek | B64D 43/00 |
| 2017/0278405 A1* | 9/2017 | Yakan | G08G 5/0034 |
| 2018/0068569 A1* | 3/2018 | Chmelarova | G01C 21/20 |
| 2018/0095464 A1* | 4/2018 | Takayama | G06V 20/176 |
| 2018/0304993 A1* | 10/2018 | Offredi | B64D 45/0056 |
| 2018/0308371 A1 | 10/2018 | Cao et al. | |
| 2019/0095725 A1 | 3/2019 | Kalghatgi et al. | |
| 2019/0324456 A1 | 10/2019 | Saunders | |
| 2020/0118446 A1 | 4/2020 | Saunders | |
| 2020/0118450 A1* | 4/2020 | Gariel | G05D 1/0088 |
| 2020/0193550 A1* | 6/2020 | Colonna | H04W 4/021 |
| 2020/0361595 A1* | 11/2020 | Offredi | G08G 5/0056 |
| 2021/0318697 A1* | 10/2021 | Tehrani | B64C 13/18 |
| 2021/0370968 A1* | 12/2021 | Xiao | G01S 17/89 |

OTHER PUBLICATIONS

"Behavior tree (artificial intelligence, robotics and control)", Wikipedia, Dec. 2020, retrieved from https://en.wikipedia.org/w/index.phptitle=Behavior_tree_(artificial_intelligence,_robotics_and_control) oldid=994954127.

Davies, J. et al., "Comparative Analysis of ACAS-Xu and DAIDALUS Detect-and-Avoid Systems", NASA, Feb. 2018, pp. 1-36.

Munoz, C. et al., "DAIDALUS: Detect and Avoid Alerting Logic for Unmanned Systems", NASA. Sep. 2015, pp. 1-12.

Extended European Search Report dated Jan. 7, 2022 in the corresponding European Application No. 21187631.3, 10 pages.

* cited by examiner

SELECTION OF AN ALTERNATE DESTINATION IN RESPONSE TO A CONTINGENCY EVENT

CROSS-REFERENCE TO RELATED APPLICATION(S)

This application claims priority to U.S. Provisional Application No. 63/059,389, filed Jul. 31, 2020, entitled Selection of an Alternate Destination in Response to a Contingency Event, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on well-trained operators to safely operate. Some of these modern robots are manned while others are unmanned in particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems, as they are not well-equipped to support the addition of new modules to the autonomy system. Furthermore, existing autonomy systems may or may not be structured for rapid adaptation to new platforms through parameterization.

Therefore it would be desirable to have a system and method that takes into account at least some of the issues discussed above, as well as other possible issues.

BRIEF SUMMARY

Example implementations of the present disclosure are directed to selection of an alternate destination for a robot in response to a contingency event, and in some examples in which the robot is an aerial robot, this alternate designation may be an alternate landing zone. According to example implementations, a contingency event may be detected during travel of a robot on a route to a destination, and this route may be a pre-planned route of the robot. The route may be associated with associated with alternate destinations. Information about these alternate destinations may be accessed and used to select an alternate destination also based on a time to travel from the robot's position to the alternate destination.

The present disclosure thus includes, without limitation, the following example implementations.

Some example implementations provide a method of supporting a robot in response to a contingency event, the method comprising detecting the contingency event during travel of the robot on a route to a destination; and in response thereto, determining a position of the robot; accessing information about alternate destinations associated with the route; selecting an alternate destination from the alternate destinations based on a time to travel from the position of the robot to the alternate destination, and the information; and outputting an indication of the alternate destination for use in at least one of guidance, navigation or control of the robot to the alternate destination.

In some example implementations of the method of any preceding example implementation, or any combination of any preceding example implementations, the time to travel is determined based on at least one of an attitude of the robot; a distance from the position of the robot to the alternate destination; a velocity of the robot; an altitude of the robot; a state of the robot; a status of the robot; a state of a route to the alternate destination; or a state of the alternate destination.

In some example implementations of the method of any preceding example implementation, or any combination of any preceding example implementations, the route is divided into route segments, and determining the position of the robot includes determining a route segment on which the robot is positioned.

In some example implementations of the method of any preceding example implementation, or any combination of any preceding example implementations, the information about the alternate destinations includes a lookup table of the route segments each of which is associated with one or more contingency routes to one or more of the alternate destinations, and selecting the alternate destination includes selecting a contingency route to an alternate destination associated with the route segment in the lookup table.

In some example implementations of the method of any preceding example implementation, or any combination of any preceding example implementations, outputting the indication of the alternate destination includes outputting an indication of the contingency route to the alternate destination.

In some example implementations of the method of any preceding example implementation, or any combination of any preceding example implementations, the route is a pre-planned route of the robot that is divided by travel time, distance or percentage of route completion into the route segments, and each of at least some of the route segments in the lookup table is associated with a pre-planned contingency route to one of the alternate destinations.

In some example implementations of the method of any preceding example implementation, or any combination of any preceding example implementations, the route segment is in the lookup table associated with multiple contingency routes to respective ones of the alternate destinations, and selecting the alternate destination includes selecting one of the multiple contingency routes to one of the respective ones of the alternate destinations that is the alternate destination.

In some example implementations of the method of any preceding example implementation, or any combination of any preceding example implementations, the multiple contingency routes are ranked according to a cost metric, and selecting the one of the multiple contingency routes includes selecting a ranked one of the multiple contingency routes to the respective ones of the alternate destinations that is feasible for landing the robot when the contingency event is detected.

In some example implementations of the method of any preceding example implementation, or any combination of any preceding example implementations, the multiple contingency routes are ranked according to the cost metric that is a function of at least one of travel time, distance, terrain along the multiple contingency routes, a type of the robot, a state of the robot, a status of the robot, or a state of an environment of the robot.

In some example implementations of the method of any preceding example implementation, or any combination of any preceding example implementations, a volume of space is defined that extends along the route and that is divided into volume segments, and determining the position of the robot includes determining a volume segment in which the robot is positioned, wherein the information about the alternate destinations includes a lookup table of the volume segments each of which is associated with one or more contingency routes to one or more of the alternate destinations, and selecting the alternate destination includes selecting a contingency route to an alternate destination associated with the volume segment in the lookup table, and wherein outputting the indication of the alternate destination includes outputting an indication of the contingency route to the alternate destination.

In some example implementations of the method of any preceding example implementation, or any combination of any preceding example implementations, determining the position of the robot includes determining the position of the robot in three dimensions.

In some example implementations of the method of any preceding example implementation, or any combination of any preceding example implementations, the alternate destinations are across a geographic region, the alternate destinations seed a Voronoi tessellation of the geographic region into cells, and determining the position of the robot includes determining a cell of the Voronoi tessellation in which the robot is positioned, and wherein the information about the alternate destinations includes information that describes the Voronoi tessellation, and selecting the alternate destination includes selecting the alternate destination that seeds the cell in which the robot is positioned.

In some example implementations of the method of any preceding example implementation, or any combination of any preceding example implementations, the alternate destinations correspond to nodes of a k-dimensional tree in which the alternate destinations are organized by position, and wherein the information about the alternate destinations includes information that describes the k-dimensional tree, and selecting the alternate destination includes performing a nearest neighbor search of the k-dimensional tree to find the alternate destination that is closest to the position of the robot.

In some example implementations of the method of any preceding example implementation, or any combination of any preceding example implementations, the method further comprises causing the robot to travel to the alternate destination.

In some example implementations of the method of any preceding example implementation, or any combination of any preceding example implementations, the method further comprises causing the robot to return to the route during travel of the robot to the alternate destination.

Some example implementations provide an apparatus for supporting a robot in response to a contingency event, the apparatus comprising a memory having computer-readable program code stored therein; and processing circuitry configured to access the memory, and execute the computer-readable program code to cause the apparatus to at least perform the method of any preceding example implementation, or any combination of any preceding example implementations.

Some example implementations provide a computer-readable storage medium for supporting a robot in response to a contingency event, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
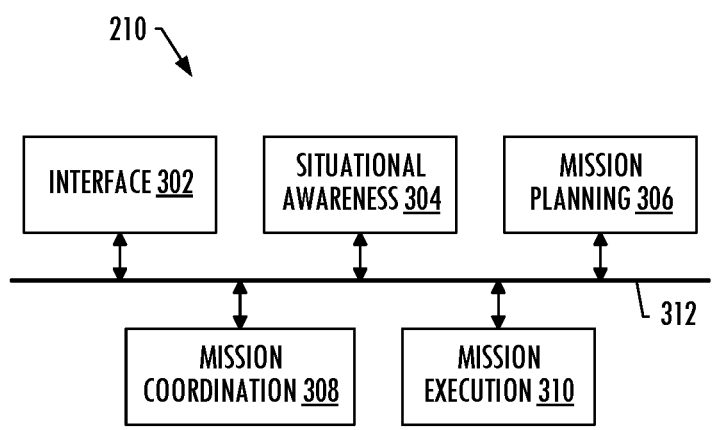
Figure 4:
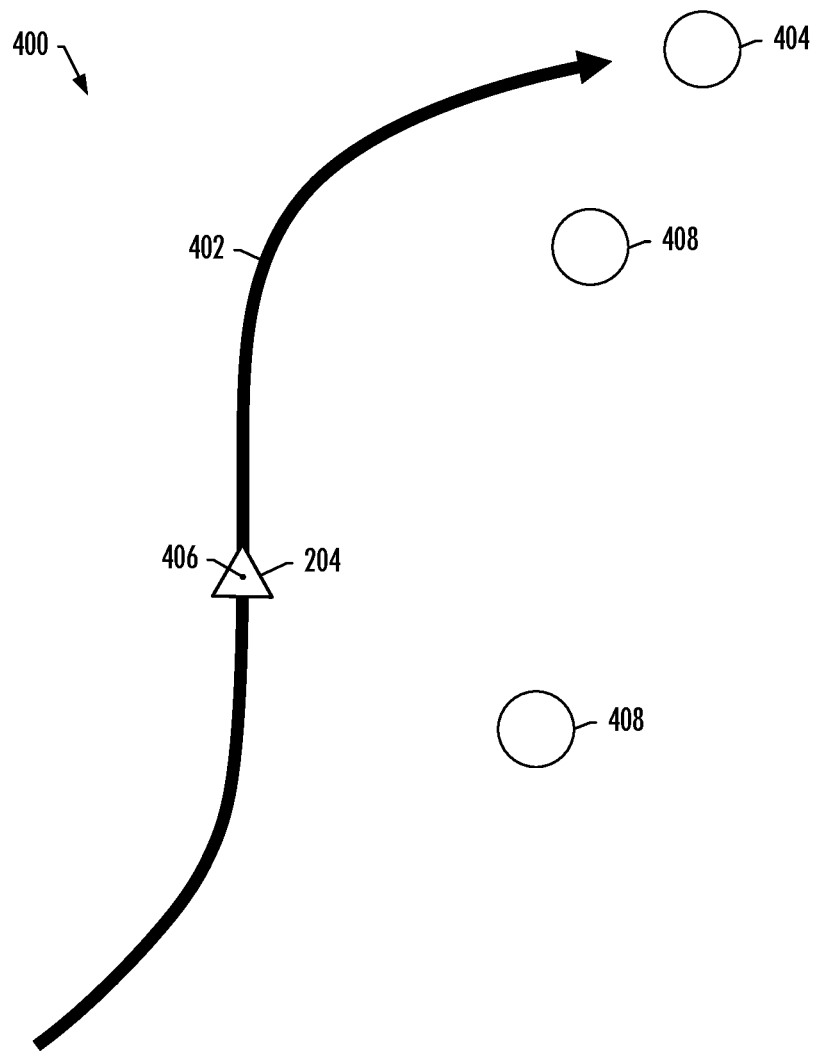
Figure 5:
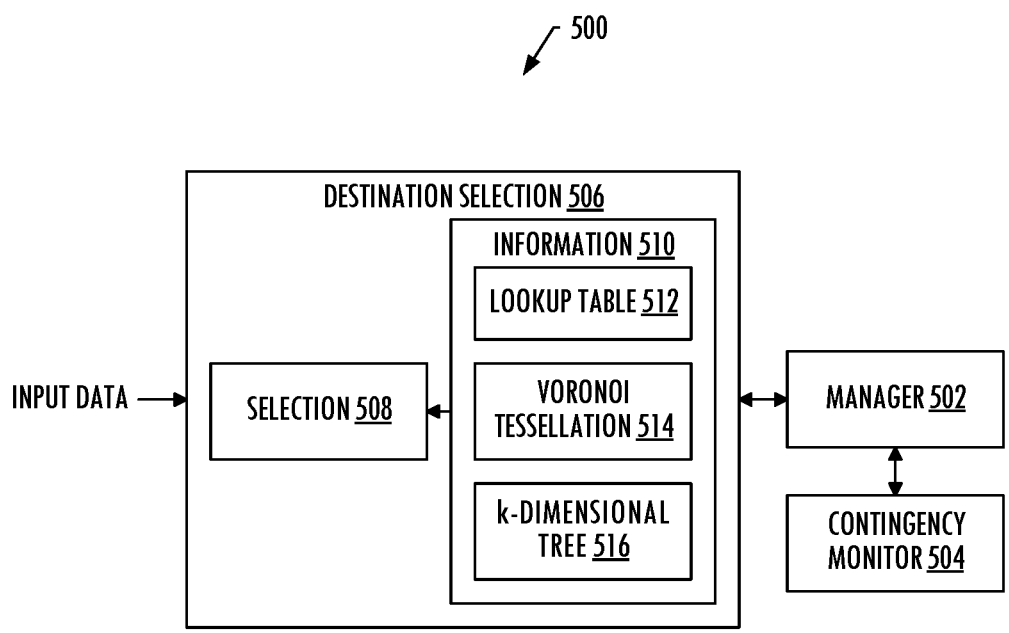
Figure 6:
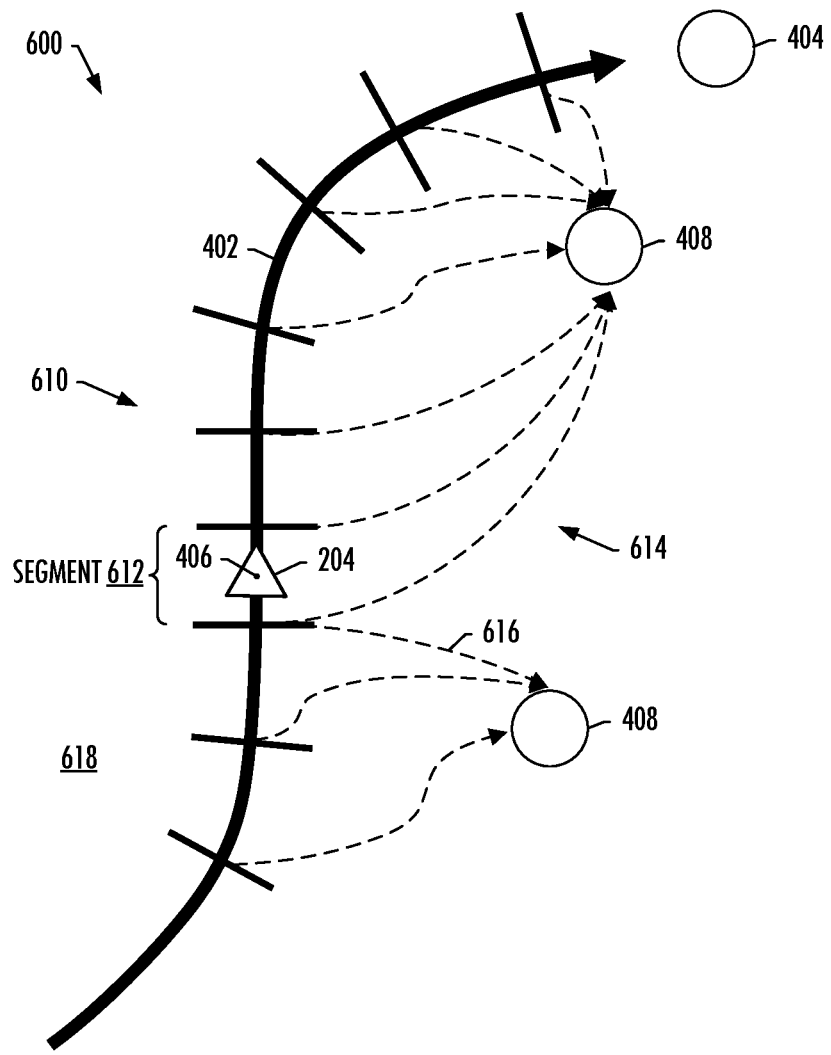
Figure 7:
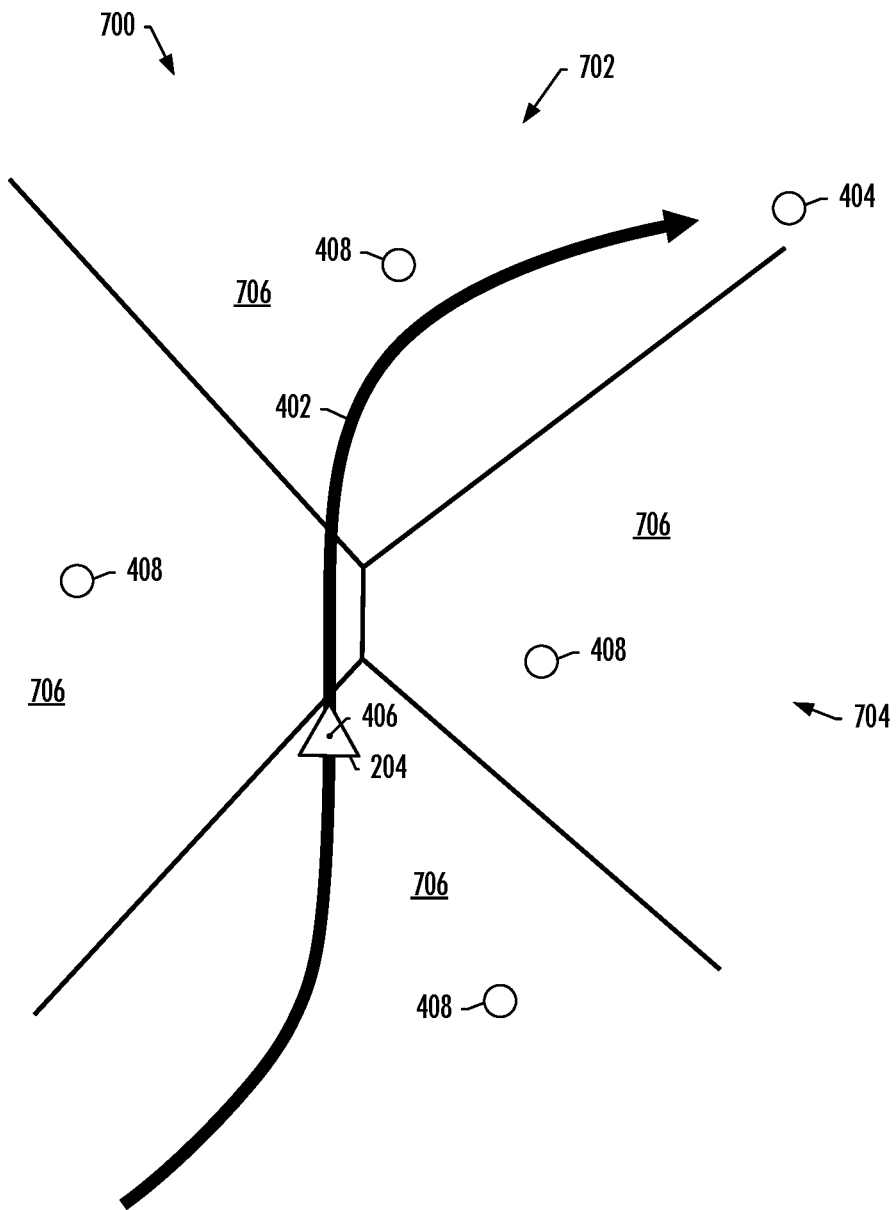
Figure 8:
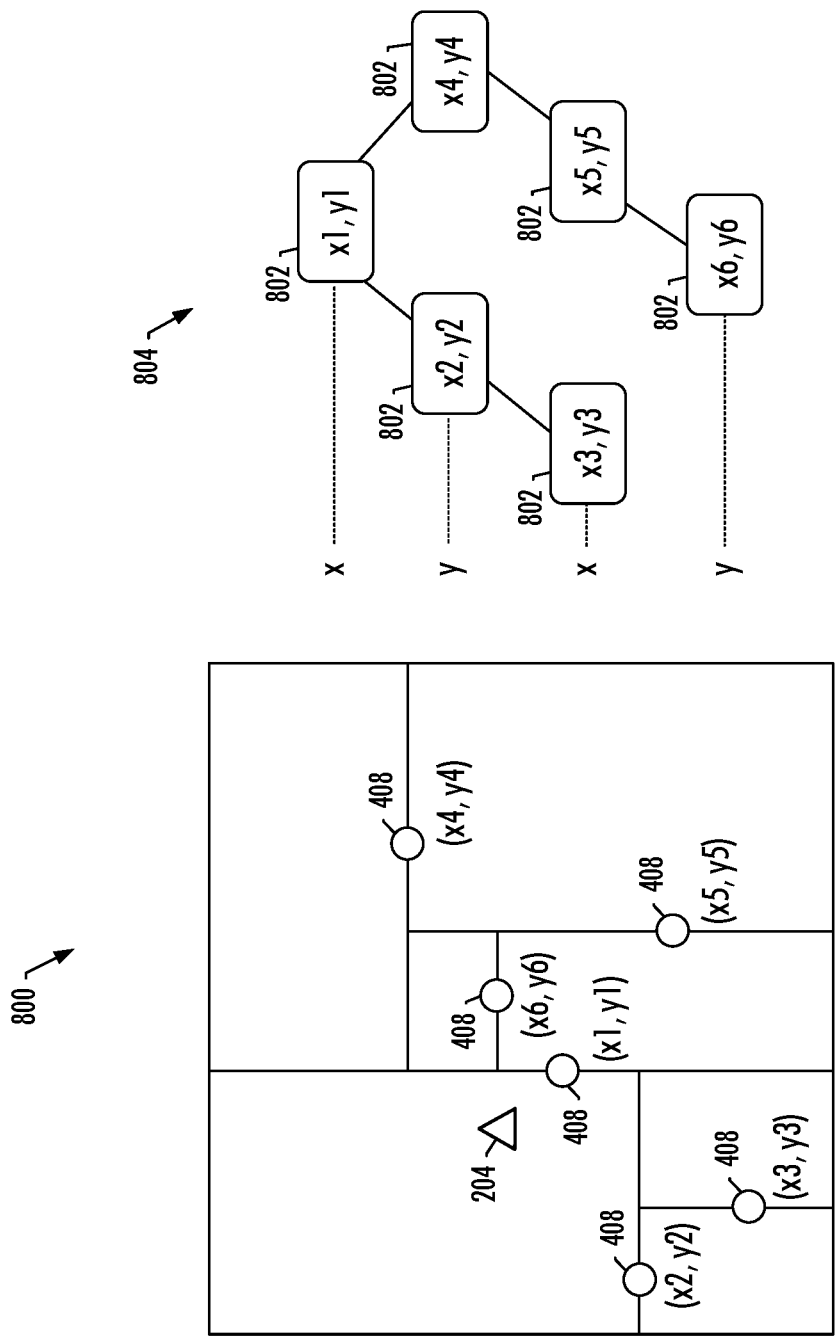
Figure 9A:
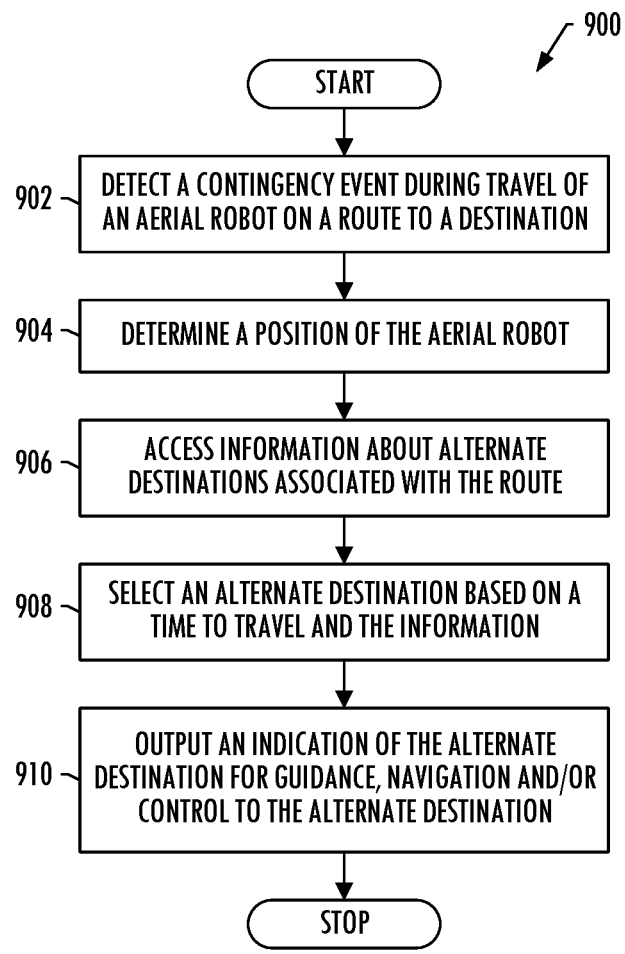
Figure 9B:
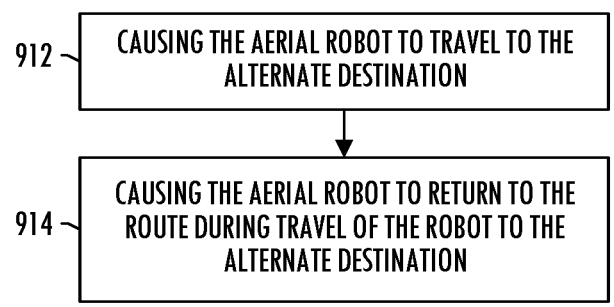
Figure 10:
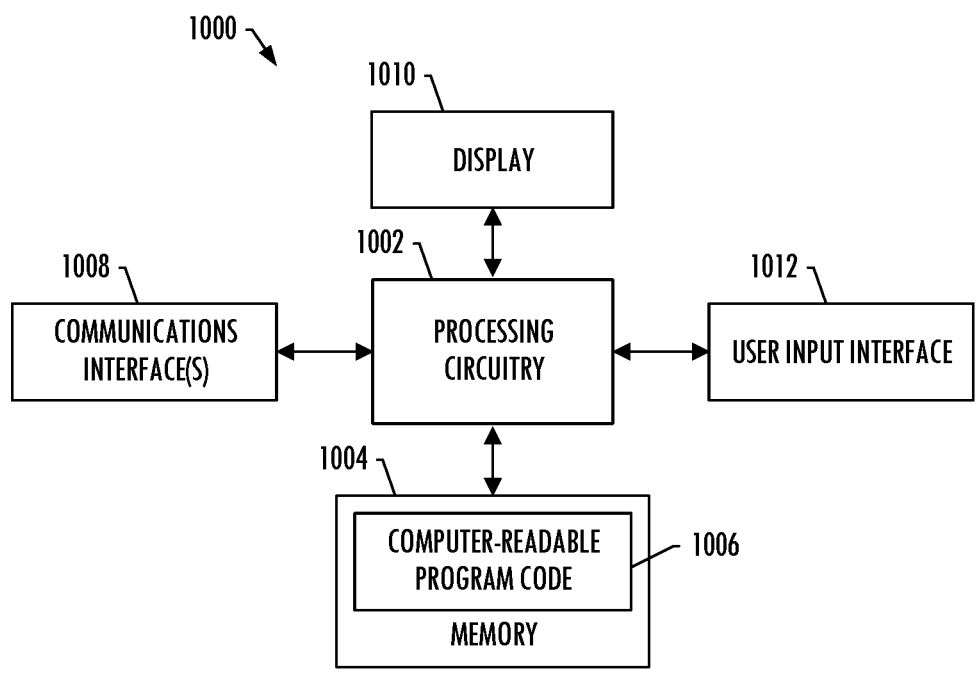

FIG. 3 more illustrates a mission management system (MMS) according to some example implementations;

FIG. 4 illustrates a scenario in which a robot is executing a mission in which the robot is to travel on a route to a destination, according to some example implementations;

FIG. 5 is a diagram of services that may be implemented by the MMS for supporting the robot (in particular an aerial robot) in response to a contingency event, according to some example implementations;

FIG. 6 illustrates a route discretization in which the route is divided into route segments, according to some example implementations;

FIG. 7 illustrates a Voronoi tessellation of a geographic region including alternate destinations associated with a route, according to some example implementations;

FIG. 8 illustrates a k-dimensional tree nearest neighbor in which alternate destinations associated with a route correspond to nodes of a k-dimensional tree in which the alternate destinations are organized by position, according to some example implementations;

FIGS. 9A and 9B are flowcharts illustrating various steps in a method of supporting a robot in response to a contingency event, according to example implementations; and FIG. 10 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
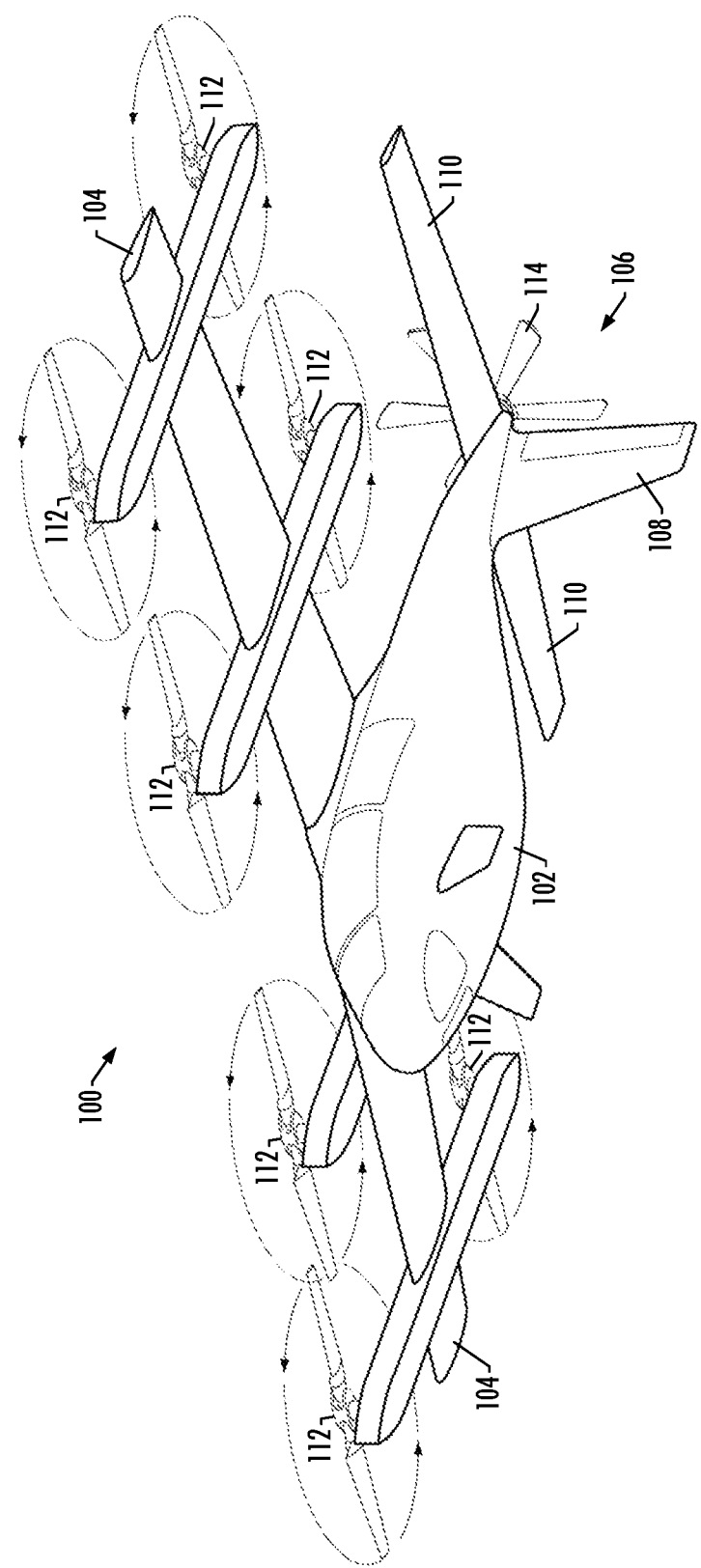
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
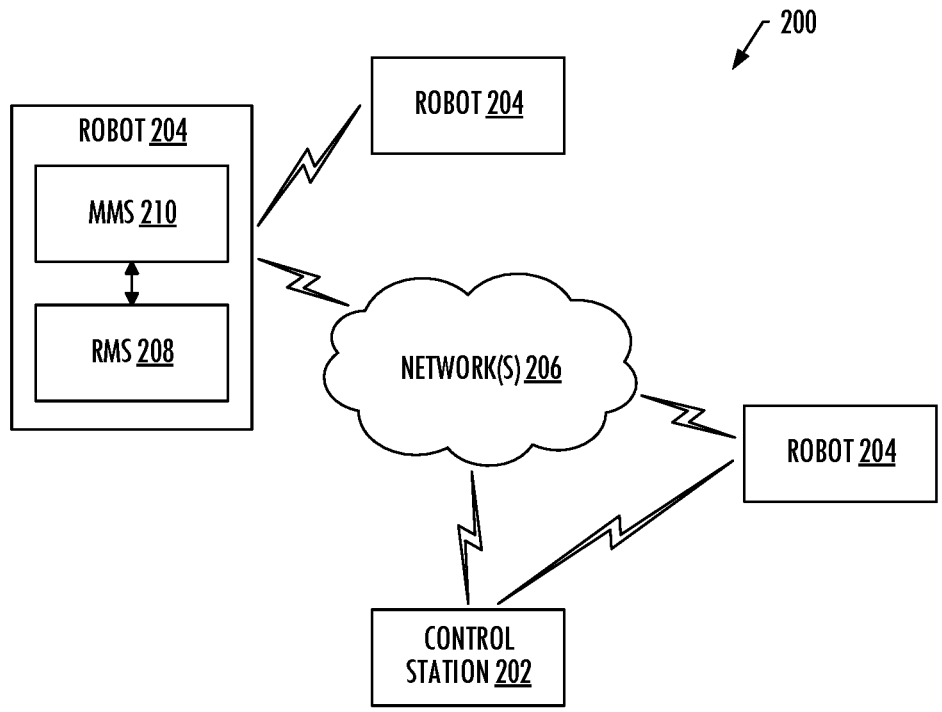
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

According to some example implementations of the present disclosure, the MMS 210 is also configured to implement software functionality or functionalities (at times referred to as services) during a mission to support the robot 204 (in particular an aerial robot) in response to a contingency event. During a mission, the robot may take a path, and this path may be described by a series of waypoints that define a route the robot will travel. The robot travels with a velocity (speed and direction of motion), and the series of waypoints and velocities at that define the route with respect to time defines a trajectory of the robot (at times referred to as a track of the robot). FIG. 4 illustrates a scenario 400 in which the robot is executing a mission in which the robot is to travel on a route 402 to a destination 404, according to some example implementations.

FIG. 5 is a diagram of services 500 that may be implemented by the MMS 210 for supporting the robot 204 (in particular an aerial robot) in response to a contingency event, according to some example implementations. As shown, the services may include a manager 502 service, a contingency monitor 504 service and a destination selection 506 service. In some examples, the manager service, contingency monitor service and destination selection service may be implemented by the mission execution subsystem 310 of the MMS.

According to some example implementations, the manager 502 service is configured to manage execution of a mission including a plurality of tasks, and which includes travel of the robot on a route 402 to a destination 404. The contingency monitor 504 service is configured to monitor for contingency events during the mission. The contingency monitor service is configured to detect a contingency event, and report the contingency event to the manager service. In response, the manager service is configured to call on the destination selection 506 service to provide an indication of an alternate destination 408. The manager service is configured to use the indication of the alternate destination in at least one of guidance, navigation or control of the robot 204 to the alternate destination; and in some examples, the manager service is configured to cause the robot to travel to the alternate destination. The destination and alternate destination may be expressed in a number of different manners. In some examples in which the robot is an aerial robot, the destination and alternate destination may be expressed as zones in which the aerial robot may land, i.e., landing zones.

As also shown, in various examples, the destination selection 506 service includes one or more sub-services (each an individual service) such as a selection 508 service configured to select the alternate destination 408 from alternate destinations associated with the route 402. In particular, the selection service is configured to determine a position 406 of the robot, and access information 510 about alternate destinations associated with the route. The selection service is configured to select the alternate destination from the alternate destinations based on a time to travel from the position of the robot 204 to the alternate destination, and the information.

In various examples, the time to travel is expressed as or otherwise determined based on input data. Examples of suitable input data include an attitude of the robot 204, a distance from the position 406 of the robot to the alternate destination 408, a velocity of the robot, an altitude of the robot, a state of the robot, a status of the robot, a state of a route to the alternate destination, or a state of the alternate destination. In some examples, at least some of the input data may be provided by or determined from data provided by various sensors onboard the robot, the RMS 208 and/or the control station 202, which may interface with the MMS 210 using the interface subsystem 302.

The selection 508 service may select the alternate destination 408 from the alternate destinations associated with the route 402 in any of a number of different manners. According to a brute force approach, for example, the selection service may determine routes from the position 406 to respective ones of the alternate destinations, estimate travel times for (times to travel) the routes and select one of the routes based on the travel times as estimated. In some of these examples, the selected one of the routes is the one of the routes with a minimum of travel times.

According to another approach, FIG. 6 illustrates a route discretization 600 in which the route 402 is divided into route segments 610, according to some examples. In some of these examples, the selection 508 service configured to determine the position 406 of the robot 204 includes the selection service configured to determine a route segment 612 on which the robot is positioned. In some of these examples, the information 510 about the alternate destinations includes a lookup table 512 of the route segments each of which is associated with one or more contingency routes 614 to one or more of the alternate destinations. In some examples, the lookup table 512 may be expressed in a tree structure such as a k-dimensional tree, an AABB (axis-aligned bounding boxes) tree or the like, which may enable an efficient query of the lookup table.

In some examples, the selection 508 service is configured to select a contingency route 616 to an alternate destination 408 associated with the route segment 612 in the lookup table, and output an indication of the contingency route to the alternate destination.

In some further examples, the route 402 is a pre-planned route of the robot 204 that is divided by travel time, distance or percentage of route completion into the route segments 610, and each of at least some of the route segments in the lookup table 512 is associated with a pre-planned contingency route 614 to one of the alternate destinations 408. Additionally or alternatively, the route segment 612 may be in the lookup table associated with multiple contingency routes to respective ones of the alternate destinations. An example of entries in the lookup table for three segments may include the following:

| Route Segment | Contingency Route(s) |
| --- | --- |
| Route Segment 1 | Route 1 |
| Route Segment 2 | Route 2 |
| Route Segment 3 | Route 3, Route 4 |

In some of these examples, the selection 508 service is configured to select one of the multiple contingency routes to one of the respective ones of the alternate destinations that is the alternate destination.

In some even further examples, the multiple contingency routes 614 (e.g., Route 3, Route 4) are ranked according to a cost metric. Examples of a suitable cost metric include a cost metric that is a function of at least one of travel time, distance, terrain along the multiple contingency routes, a type of the robot 204, a state of the robot, a status of the robot, or a state of an environment of the robot. In some of these examples, the selection 508 service is configured to select a ranked one (e.g., highest ranked one) of the multiple contingency routes to the respective ones of the alternate destinations 408 that is feasible for landing the robot when the contingency event is detected.

In various examples, the selection 508 service may determine the position 406 of the robot 204 in two dimensions (2D) or in three dimensions (3D). In the 3D case, for example, the route discretization 600 may be a top view of the route 402, where a volume of space 618 is defined that extends along the route and that is divided into the route segments 610 that are volume segments. In some of these examples, the selection 508 service configured to determine the position 406 of the robot 204 includes the selection service configured to determine the route segment 612 that is a volume segment in which the robot is positioned. Also in some of these examples, similar to before, the information 510 about the alternate destinations 408 includes the lookup table 512 of the volume segments each of which is associated with one or more contingency routes 614 to one or more of the alternate destinations. Also similar to before, the selection service may be configured to selecting the contingency route 616 to the alternate destination associated with the volume segment in the lookup table, and output the indication of the contingency route to the alternate destination.

FIG. 7 illustrates a Voronoi tessellation 700 of a geographic region 702 including the alternate destinations 408, according to some example implementations. As shown, in some examples, the alternate destinations are across the geographic region, and seed the Voronoi tessellation of the geographic region into cells 706. In some of these examples, the selection 508 service configured to determine the position 406 of the robot 204 includes the selection service configured to determine a cell of the Voronoi tessellation in which the robot is positioned. Also in some of these examples, the information 510 about the alternate destinations includes information 514 that describes the Voronoi tessellation, and the selection service is configured to select the alternate destination that seeds the cell in which the robot is positioned.

FIG. 8 illustrates a k-dimensional tree nearest neighbor 800 in which the alternate destinations 408 correspond to nodes 802 of a k-dimensional tree 804 in which the alternate destinations are organized by position, according to some examples. In some of these examples, the information 510 about the alternate destinations includes information 516 that describes the k-dimensional tree. Also in some of these examples, the selection 508 service configured to select the alternate destination includes the selection service configured to perform a nearest neighbor search of the k-dimensional tree to find the alternate destination that is closest to the position 406 of the robot 204.

Returning to FIG. 5, again, the destination selection 506 service of the MMS 210 may provide an indication of an alternate destination 408 to the manager 502 service in response to detection of a contingency event by the contingency monitor 504 service. The manager service may use the indication of the alternate destination in at least one of guidance, navigation or control of the robot 204 to the alternate destination. In some examples, the manager service is configured to cause the robot to travel to the alternate destination. In some further examples, the manager service is configured to cause the robot to return to the route 402 during travel of the robot to the alternate destination. This may include the MMS configured to send one or more maneuver commands to the RMS 208 to control the robot to follow the maneuver commands and thereby travel to the alternate destination, and in some examples return to the route.

FIGS. 9A and 9B are flowcharts illustrating various steps in a method 900 of supporting an aerial robot 204 in response to a contingency event, according to example implementations of the present disclosure. As shown at block 902 of FIG. 9A, the method includes detecting the contingency event during travel of the robot on a route 402 to a destination 404. In response, the method includes determining a position 406 of the robot, and accessing information 510 about alternate destinations 408 associated with the route, as shown at blocks 904 and 906.

The method 900 includes selecting an alternate destination 408 from the alternate destinations based on a time to travel from the position of the robot 204 to the alternate destination, and the information 510, as shown at block 908. In various examples, the time to travel is determined based on input data such as at least one of an attitude of the robot 204, a distance from the position 406 of the robot to the alternate destination 408, a velocity of the robot, an altitude of the robot, a state of the robot, a status of the robot, a state of a route to the alternate destination, or a state of the alternate destination. The method also includes outputting an indication of the alternate destination for use in at least one of guidance, navigation or control of the robot to the alternate destination, as shown at block 910.

In some examples, the route 402 is divided into route segments 610, and determining the position 406 of the robot 204 at block 904 includes determining a route segment 612 on which the robot is positioned. In some of these examples, the information 510 about the alternate destinations 408 includes a lookup table 512 of the route segments each of which is associated with one or more contingency routes 614 to one or more of the alternate destinations. Selecting the alternate destination at block 908, then, includes selecting a contingency route 616 to an alternate destination associated with the route segment in the lookup table, and outputting the indication of the alternate destination at block 910 includes outputting an indication of the contingency route to the alternate destination.

In some further examples, the route 402 is a pre-planned route of the robot 204 that is divided by travel time, distance or percentage of route completion into the route segments 610, and each of at least some of the route segments in the lookup table 512 is associated with a pre-planned contingency route 614 to one of the alternate destinations 408. Additionally or alternatively, in some further examples, the route segment 612 is in the lookup table associated with multiple contingency routes to respective ones of the alternate destinations. In some of these examples, selecting the alternate destination at block 908 includes selecting one of the multiple contingency routes to one of the respective ones of the alternate destinations that is the alternate destination.

In some even further examples, the multiple contingency routes 614 are ranked according to a cost metric. Examples of a suitable cost metric include a cost metric that is a function of at least one of travel time, distance, terrain along the multiple contingency routes, a type of the robot 204, a state of the robot, a status of the robot, or a state of an environment of the robot. In some of these examples, selecting the one of the multiple contingency routes at block 908 includes selecting a ranked one of the multiple contingency routes to the respective ones of the alternate destinations 408 that is feasible for landing the robot when the contingency event is detected.

In some examples, determining the position 406 of the robot 204 at block 904 includes determining the position of the robot in three dimensions.

In some examples, a volume of space 618 is defined that extends along the route 402 and that is divided into the route segments 610 that are volume segments. In some of these examples, determining the position 406 of the robot 204 at block 904 includes determining the route segment 612 that is a volume segment in which the robot is positioned. Also in some of these examples, the information 510 about the alternate destinations 408 includes a lookup table 512 of the volume segments each of which is associated with one or more contingency routes 614 to one or more of the alternate destinations. Selecting the alternate destination at block 908 includes selecting a contingency route 616 to an alternate destination associated with the volume segment in the lookup table, and outputting the indication of the alternate destination at block 910 includes outputting an indication of the contingency route to the alternate destination.

In some examples, the alternate destinations 408 are across a geographic region 702, and seed a Voronoi tessellation 704 of the geographic region into cells 706. In some of these examples, determining the position 406 of the robot 204 at block 904 includes determining a cell of the Voronoi tessellation in which the robot is positioned. Also in some of these examples, the information 510 about the alternate destinations includes information 514 that describes the Voronoi tessellation, and selecting the alternate destination at block 908 includes selecting the alternate destination that seeds the cell in which the robot is positioned.

In some examples, the alternate destinations 408 correspond to nodes 802 of a k-dimensional tree 804 in which the alternate destinations are organized by position. In some of these examples, the information 510 about the alternate destinations includes information 516 that describes the k-dimensional tree. Also in some of these examples, selecting the alternate destination at block 908 includes performing a nearest neighbor search of the k-dimensional tree to find the alternate destination that is closest to the position 406 of the robot 204.

As shown at block 912, in some examples, the method 900 further includes causing the robot 204 to travel to the alternate destination 408. And in some further examples, the method includes causing the robot 204 to return to the route 402 during travel of the robot to the alternate destination 408, as shown at block 914.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 10 illustrates an apparatus 1000 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1002 (e.g., processor unit) connected to a memory 1004 (e.g., storage device).

The processing circuitry 1002 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1004 (of the same or another apparatus).

The processing circuitry 1002 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1004 is generally any piece of computer hardware that is capable of storing information such as, for example, data, computer programs (e.g., computer-readable program code 1006) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1004, the processing circuitry 1002 may also be connected to one or more interfaces for displaying, transmitting and/or receiving information. The interfaces may include a communications interface 1008 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1010 and/or one or more user input interfaces 1012 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1000 may include a processing circuitry 1002 and a computer-readable storage medium or memory 1004 coupled to the processing circuitry, where the processing circuitry is configured to execute computer-readable program code 1006 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting an autonomous or unmanned vehicle in response to a contingency event, the apparatus comprising:
   a memory configured to store computer-readable program code; and
   a processing circuitry configured to access the memory, and execute the computer-readable program code to cause the apparatus to detect the contingency event while the autonomous or unmanned vehicle travels on a route prior to reaching a landing zone at an initial destination; and
   in response to detecting the contingency event prior to reaching the landing zone at the initial destination cause the apparatus to:
      determine a position of the autonomous or unmanned vehicle;
      access information about alternate destinations associated with the route which includes one or more contingency routes to the alternate destinations, wherein the alternate destinations are at locations different from the initial destination;
      select an alternate destination from the alternate destinations based on a time to travel from the position of the autonomous or unmanned vehicle to the alternate destination, and the information about the alternate destinations associated with the route;
      select a highest ranked one of a contingency route from the contingency routes associated with the selected alternate destination; and
      output an indication of the selected alternate destination for use in at least one of guidance, navigation, or control of the autonomous or unmanned vehicle to the alternate destination.

2. The apparatus of claim 1, wherein the time to travel is determined based on at least one of:
   an attitude of the autonomous or unmanned vehicle;
   a distance from the position of the autonomous or unmanned vehicle to the alternate destination;
   a velocity of the autonomous or unmanned vehicle;
   an altitude of the autonomous or unmanned vehicle;
   a state of the autonomous or unmanned vehicle;
   a status of the autonomous or unmanned vehicle;
   a state of a route to the alternate destination; or
   a state of the alternate destination.

3. The apparatus of claim 1, wherein the route is divided into route segments, and the apparatus being caused to determine the position of the autonomous or unmanned vehicle includes the apparatus being caused to determine a route segment on which the autonomous or unmanned vehicle is positioned.

4. The apparatus of claim 3, wherein the information about the alternate destinations includes a lookup table of the route segments each of which is associated with the one or more contingency routes of the contingency event to one or more of the alternate destinations, and the apparatus being caused to select the highest ranked one of the contingency route from the contingency routes includes the apparatus being caused to select the contingency route from the contingency routes to the alternate destination associated with the route segment in the lookup table.

5. The apparatus of claim 4, wherein the apparatus being caused to output the indication of the alternate destination includes the apparatus being caused to output an indication of the contingency route to the alternate destination.

6. The apparatus of claim 4, wherein the route is a pre-planned route of the autonomous or unmanned vehicle that is divided by travel time, distance or percentage of route completion into the route segments, and each of at least some of the route segments in the lookup table is associated with a pre-planned contingency route to one of the alternate destinations.

7. The apparatus of claim 4, wherein the route segment is in the lookup table associated with multiple contingency routes to respective ones of the alternate destinations, and the apparatus being caused to select the alternate destination includes the apparatus being caused to select one of the multiple contingency routes to one of the respective ones of the alternate destinations that is the alternate destination.

8. The apparatus of claim 7, wherein the multiple contingency routes are ranked according to a cost metric, and the apparatus being caused to select the one of the multiple contingency routes includes the apparatus being caused to select a ranked one of the multiple contingency routes to the respective ones of the alternate destinations that is feasible for landing the autonomous or unmanned vehicle when the contingency event is detected.

9. The apparatus of claim 8, wherein the multiple contingency routes are ranked according to the cost metric that is a function of at least one of travel time, distance, terrain along the multiple contingency routes, a type of the autonomous or unmanned vehicle, a state of the autonomous or unmanned vehicle, a status of the autonomous or unmanned vehicle, or a state of an environment of the autonomous or unmanned vehicle.

10. The apparatus of claim 1, wherein a volume of space is defined that extends along the route and that is divided into volume segments, and the apparatus being caused to determine the position of the autonomous or unmanned vehicle includes the apparatus being caused to determine a volume segment of the volume segments in which the autonomous or unmanned vehicle is positioned,
   wherein the information about the alternate destinations includes a lookup table of the volume segments each of which is associated with the one or more contingency routes to one or more of the alternate destinations, and the apparatus being caused to select the highest ranked one of the contingency route from the contingency routes includes the apparatus being caused to select the contingency route from the contingency routes to the alternate destination associated with the volume segment in the lookup table, and
   wherein the apparatus being caused to output the indication of the alternate destination includes the apparatus being caused to output an indication of the contingency route to the alternate destination.

11. The apparatus of claim 1, wherein the alternate destinations are across a geographic region, the alternate destinations seed a Voronoi tessellation of the geographic region into cells, and the apparatus caused to determine the position of the autonomous or unmanned vehicle includes the apparatus caused to determine a cell of the Voronoi tessellation in which the autonomous or unmanned vehicle is positioned, and wherein the information about the alternate destinations includes information that describes the Voronoi tessellation, and the apparatus is caused to select the alternate destination that seeds the cell in which the autonomous or unmanned vehicle is positioned.

12. The apparatus of claim 1, wherein the alternate destinations correspond to nodes of a k-dimensional tree in which the alternate destinations are organized by position, and wherein the information about the alternate destinations includes information that describes the k-dimensional tree, and the apparatus being caused to select the alternate destination includes the apparatus being caused to perform a nearest neighbor search of the k-dimensional tree to find the alternate destination that is closest to the position of the autonomous or unmanned vehicle.

13. The apparatus of claim 1, wherein the processing circuitry is configured to execute the computer-readable program code to cause the apparatus to further cause the autonomous or unmanned vehicle to travel to the alternate destination.

14. The apparatus of claim 13, wherein the processing circuitry is configured to execute the computer-readable program code to cause the apparatus to further cause the autonomous or unmanned vehicle to return to the route while the autonomous or unmanned vehicle travels to the alternate destination.

15. A method of supporting an autonomous or unmanned vehicle in response to a contingency event, the method comprising:

detecting the contingency event while the autonomous or unmanned vehicle travels on a route prior to reaching a landing zone at an initial destination; and in response to detecting the contingency event prior to reaching the landing zone cause an apparatus, having a memory configured to store computer-readable program code and having processing circuitry configured to access the memory and execute the computer-readable program code, to perform:

determining a position of the autonomous or unmanned vehicle;

accessing information about alternate destinations associated with the route which includes one or more contingency routes to the alternate destinations, wherein the alternate destinations are at locations different from the initial destination;

selecting an alternate destination from the alternate destinations based on a time to travel from the position of the autonomous or unmanned vehicle to the alternate destination, and the information about the alternate destinations associated with the route;

selecting a highest ranked one of a contingency route from the contingency routes associated with the selected alternate destination; and outputting an indication of the selected alternate destination for use in at least one of guidance, navigation, or control of the autonomous or unmanned vehicle to the alternate destination.

16. The method of claim 15, wherein the time to travel is determined based on at least one of:

an attitude of the autonomous or unmanned vehicle;
a distance from the position of the autonomous or unmanned vehicle to the alternate destination;

a velocity of the autonomous or unmanned vehicle;
an altitude of the autonomous or unmanned vehicle;
a state of the autonomous or unmanned vehicle;
a status of the autonomous or unmanned vehicle;
a state of a route to the alternate destination; or
a state of the alternate destination.

17. The method of claim 15, wherein the route is divided into route segments, and determining the position of the autonomous or unmanned vehicle includes determining a route segment on which the autonomous or unmanned vehicle is positioned.

18. The method of claim 17, wherein the information about the alternate destinations includes a lookup table of the route segments each of which is associated with the one or more contingency routes of the contingency event to one or more of the alternate destinations, and selecting the highest ranked one of the contingency route from the contingency routes includes selecting the contingency route from the contingency routes to the alternate destination associated with the route segment in the lookup table.

19. The method of claim 18, wherein outputting the indication of the alternate destination includes outputting an indication of the contingency route to the alternate destination.

20. The method of claim 18, wherein the route is a pre-planned route of the autonomous or unmanned vehicle that is divided by travel time, distance or percentage of route completion into the route segments, and each of at least some of the route segments in the lookup table is associated with a pre-planned contingency route to one of the alternate destinations.

21. The method of claim 18, wherein the route segment is in the lookup table associated with multiple contingency routes to respective ones of the alternate destinations, and selecting the alternate destination includes selecting one of the multiple contingency routes to one of the respective ones of the alternate destinations that is the alternate destination.

22. The method of claim 21, wherein the multiple contingency routes are ranked according to a cost metric, and selecting the one of the multiple contingency routes includes selecting a ranked one of the multiple contingency routes to the respective ones of the alternate destinations that is feasible for landing the autonomous or unmanned vehicle when the contingency event is detected.

23. The method of claim 22, wherein the multiple contingency routes are ranked according to the cost metric that is a function of at least one of travel time, distance, terrain along the multiple contingency routes, a type of the autonomous or unmanned vehicle, a state of the autonomous or unmanned vehicle, a status of the autonomous or unmanned vehicle, or a state of an environment of the autonomous or unmanned vehicle.

24. The method of claim 15, wherein a volume of space is defined that extends along the route and that is divided into volume segments, and determining the position of the autonomous or unmanned vehicle includes determining a volume segment of the volume segments in which the autonomous or unmanned vehicle is positioned, wherein the information about the alternate destinations includes a lookup table of the volume segments each of which is associated with the one or more contingency routes to one or more of the alternate destinations, and selecting the contingency route from the contingency routes includes selecting the contingency route from the contingency routes to the alternate destination associated with the volume segment in the lookup table, and wherein outputting the indication of the alternate destination includes outputting an indication of the contingency route to the alternate destination.

25. The method of claim 15, wherein the alternate destinations are across a geographic region, the alternate destinations seed a Voronoi tessellation of the geographic region into cells, and determining the position of the autonomous or unmanned vehicle includes determining a cell of the Voronoi tessellation in which the autonomous or unmanned vehicle is positioned, and wherein the information about the alternate destinations includes information that describes the Voronoi tessellation, and selecting the alternate destination includes selecting the alternate destination that seeds the cell in which the autonomous or unmanned vehicle is positioned.

26. The method of claim 15, wherein the alternate destinations correspond to nodes of a k-dimensional tree in which the alternate destinations are organized by position, and wherein the information about the alternate destinations includes information that describes the k-dimensional tree, and selecting the alternate destination includes performing a nearest neighbor search of the k-dimensional tree to find the alternate destination that is closest to the position of the autonomous or unmanned vehicle.

27. The method of claim 15 further comprising causing the autonomous or unmanned vehicle to travel to the alternate destination.

28. The method of claim 27 further comprising causing the autonomous or unmanned vehicle to return to the route while the autonomous or unmanned vehicle travels to the alternate destination.

\* \* \* \* \*